(12) United States Patent
Liao et al.

(10) Patent No.: US 9,929,593 B2
(45) Date of Patent: Mar. 27, 2018

(54) MULTI-OUTPUT POWER MANAGEMENT METHOD

(71) Applicant: CYBERPOWER SYSTEMS, INC., Taipei (TW)

(72) Inventors: Chun-Chao Liao, Taipei (TW); Chao-Ching Yang, Taipei (TW)

(73) Assignee: Cyberpower Systems, Inc., Taipei (TW)

( * ) Notice: Subject to any disclaimer, the term of this patent is extended or adjusted under 35 U.S.C. 154(b) by 219 days.

(21) Appl. No.: 14/848,833

(22) Filed: Sep. 9, 2015

(65) Prior Publication Data

US 2016/0126788 A1 May 5, 2016

(30) Foreign Application Priority Data

Nov. 5, 2014 (TW) .............................. 103138396 A (51) Int. Cl.
*H02J 9/00* (2006.01)
*H02J 9/06* (2006.01)
*H02J 7/00* (2006.01)

(52) U.S. Cl.
CPC ............ *H02J 9/062* (2013.01); *H02J 7/0068* (2013.01)

(58) Field of Classification Search
None
See application file for complete search history.

(56) References Cited

U.S. PATENT DOCUMENTS

| 2013/0169046 A1* | 7/2013 | Shin | H02J 9/062 307/23 |
| 2014/0116133 A1* | 5/2014 | Sheynblat | G01C 21/16 73/504.02 |
| 2016/0126787 A1* | 5/2016 | Liao | H02J 9/005 307/66 |

* cited by examiner

*Primary Examiner* — Long Nguyen
(74) *Attorney, Agent, or Firm* — Rosenberg, Klein & Lee (57) ABSTRACT

A multi-output power management method used in a UPS system for enabling a microcontroller to determine whether to execute an automatic setting or manual setting. In automatic setting, the microcontroller conducts the parameter setting of a multi-output selector output mode, and switches a multi-output selector to a bypass or DC to AC inverter output mode after confirming that the power status parameter is in a predetermined multi-output selector parameter setting range. In manual setting, the multi-output selector can be manually switched to the bypass or DC to AC inverter output mode. Thus, multiple switching units of the multi-output selector of the UPS system can be respectively selectively switched to the bypass or DC to AC inverter output mode to provide different AC outputs to a respective load under the priority of energy saving or electrical safety, enhancing the electrical efficiency of UPS system and achieving the effect of energy saving.

9 Claims, 12 Drawing Sheets

MULTI-OUTPUT POWER MANAGEMENT METHOD

This application claims the priority benefit of Taiwan patent application number 103138396, filed on Nov. 5, 2014.

BACKGROUND OF THE INVENTION

1. Field of the Invention

The present invention relates to UPS SYSTEM (Uninterruptible Power Supply) technology and more particularly, to a multi-output power management method used in a UPS system, which allows automatic or manual execution of setting so that a multi-output selector can be automatically switched by a microcontroller or manually switched by a user between a bypass output mode and a DC to AC inverter output mode for providing different AC outputs to loads under the priority of energy saving or electrical safety.

2. Description of the Related Art

Following the development of modern electronic technology in a rapid rate of growth, there is now a clear trend in computer science towards high performance computing capabilities, high speed and small size. Because many electronic apparatuses and equipments use a computer to control their actions or executive functions, computer therefore occupies a very important position in various industries. As the processing speed and performance of modern computers and servers have been greatly improved, the data storage capacity of memory means in the host computer, server chassis, data storage center or telecommunication center shall be relatively increased for storing more data. Taking into account the stability of the overall system and the problem that interruption of power can cause component damage, lifespan shortening and data loss, the supplying quality of power supply will be even more important.

Further, in order to effectively solve the aforesaid power supply problem, it is the common way to use a UPS system for providing electricity immediately upon interruption of power supply. A UPS system can conduct the functions of voltage stabilization, removal of surge and noise and lightning protection, providing stable and clean power to a computer, server, network equipment, security system, medical equipment, data storage center, industrial equipment for normal functioning without causing damage or paralysis. Commercial UPS systems can be categorized into Off-Line, On-Line and Lin-Interactive types. When the AC mains or AC power supply is normally provided, the microcontroller of the UPS system controls the transfer switch to switch the load to bypass for enabling inputted AC Mains or AC power supply to be directly delivered to the load, or to switch the load to an inverter for enabling DC power to be converted into stabilized AC power supply for output to the load. On the other hand, a charger or the inverter can used for converting the inputted AC mains or AC power supply into DC power supply for charging the battery so that the battery can provide power supply in case of a power interruption. If the input power supply is not normal, the transfer switch will switch the load to the inverter, enabling the inverter to convert the DC power into stabilized AC power for the load, achieving the effect of uninterruptible power supply.

However, every UPS system commonly has a plurality of loads connected to the output end thereof, and will continuously conduct the uninterruptible power supply function during the operation of the loads. If the voltage or current of the inputted AC mains or AC power supply becomes unstable, the rectifying circuit, power correction circuit or filter circuit of the normal mode main loop will conduct a rectification process to provide stable and clean power supply to the loads. If the input of the AC mains or AC power supply is normal, the UPS system will be switched to the Energy Saving Mode, enabling the inputted AC mains or AC power supply to be directly delivered through the bypass to the loads without through the main loop, reducing power conversion loss and enhancing the effect of energy saving. However, under different load characteristics and operating conditions, the power loss of the load operating mode or standby mode varies widely. Under the Energy Saving Mode, the aforesaid UPS system can achieve the energy saving effect, the load power protection effect of the UPS system during operation is poor, lowering electrical safety. If the UPS system is set to provide AC power supply to the loads in the normal mode under the condition that electrical safety is in the priority, the transfer switch shall have to be frequently switched to the inverter for rectifying the DC power supply into AC power supply, and the battery needs to be recharged after discharge of power, increasing power loss, and thus, it is not possible to achieve the effects of energy saving and reduce electricity costs as the loads are in the standby mode. Further, commercial UPS systems can simply provide power output to all the loads under the same condition that energy saving or electrical safety is in the priority, they cannot switch every individual load between the Normal Mode and the Energy Saving Mode for providing a different power output to a different load, thus, the function and effect of the UPS system are limited. An improvement in this regard is required.

SUMMARY OF THE INVENTION

The present invention has been accomplished under the circumstances in view. It is therefore the primary object of the present invention to provide a multi-output power management method used in a multi-output power management system that comprises an input power source, a UPS (Uninterruptible Power Supply) system and a plurality of loads. The UPS system comprises a microcontroller, a DC to AC inverter and a multi-output selector electrically coupled to the microcontroller, stored energy systems electrically coupled to the DC to AC inverter, and a DC to AC inverter electrically coupled to the multi-output selector, the input power source and the loads. In the application of the multi-output power management method, the microcontroller determines whether or not to automatically execute power output through the multi-output selector. In case of automatically executing power output through the multi-output selector, the microcontroller immediately conducts a multi-output selector output mode parameter setting, and then confirms the power status parameter of the input power source, and then determines whether or not the power status parameter of the input power source is within the parameter setting range of the bypass output mode of the multi-output selector. Then, the microcontroller will switch the multi-output selector to the bypass output mode if the power status parameter of the input power source is within the parameter setting range of the bypass output mode of the multi-output selector, or switch the multi-output selector to the DC to AC inverter output mode if the power status parameter of the input power source is beyond the parameter setting range of the bypass output mode of the multi-output selector. In case of manual setting, manually switch the multi-output selector to the bypass output mode or DC to AC inverter output mode. Thus, the microcontroller of the UPS system can conduct the parameter settings of the multi-output selector output mode subject to different load characteristics and operation conditions of multiple loads, and can control the multiple switching unites of the multi-output selector to switch to the bypass output mode or DC to AC inverter output mode, providing a different AC output to every respective load under the priority of energy saving or electrical safety, enhancing the power efficiency of the UPS system and achieving the effect of energy saving.

In an alternate form of the invention, the UPS system comprises a microcontroller, an AC to DC converter, a DC to AC inverter and a multi-output selector electrically coupled to the microcontroller, stored energy systems electrically coupled to the DC to AC inverter, a DC to AC inverter electrically coupled to the multi-output selector, the input power source and the loads, an AC to DC rectifier electrically coupled to the microcontroller, the stored energy systems and the input power source, and an automatic voltage regulator and a transfer switch electrically coupled to the microcontroller. The automatic voltage regulator is also electrically coupled to the multi-output selector and the transfer switch. The transfer switch is also electrically coupled to the multi-output selector and the input power source. The multi-output selector is also electrically coupled to the input power source. In the application of the multi-output power management method, the microcontroller determines whether or not to automatically execute power output through the multi-output selector. In case of automatically executing power output through the multi-output selector, the microcontroller immediately conducts a multi-output selector output mode parameter setting, and then confirms the power status parameter of the input power source, and then determines whether or not the power status parameter of the input power source is within the parameter setting range of the bypass output mode of the multi-output selector. Then, the microcontroller will switch the multi-output selector to the bypass output mode if the power status parameter of the input power source is within the parameter setting range of the bypass output mode of the multi-output selector. Thereafter, the microcontroller determines whether or not the power status parameter of the input power source is within the parameter setting range of the automatic voltage regulator output mode. Then, the microcontroller will switch the multi-output selector to the automatic voltage regulator output mode if the power status parameter of the input power source is within the parameter setting range of the automatic voltage regulator mode, or switch the multi-output selector to the DC to AC inverter output mode if the power status parameter of the input power source is beyond the parameter setting range of the automatic voltage regulator mode. In case of manual setting, manually switch the multi-output selector to the bypass output mode, automatic voltage regulator output mode or DC to AC inverter output mode for providing a different AC output to each respective load. Thus, the automatic voltage regulator can maintain the voltage output in a stabilized status without being affected by the variation of the input power source and the loads, enhancing the power efficiency of the UPS system and achieving the effect of energy saving.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Referring to FIGS. 1-6, the invention provides a multi-output power management system and a multi-output power management method used in the multi-output power management system. The multi-output power management system comprises a UPS (Uninterruptible Power Supply) system 1, an input power source 2, and multiple loads 3. The UPS System 1 comprises a microcontroller 11, a DC to AC inverter 12 and a multi-output selector 13 respectively electrically connected to the microcontroller 11, and stored energy systems, for example, stored energy systems 14 electrically connected to the DC to AC inverter 12. The multi-output selector 13 comprises a first switching unit 131 and a second switching unit 132. The first switching unit 131 and the second switching unit 132 can be relays or static transfer switches, respectively electrically connected to the DC to AC inverter 12, the input power source 2 and the loads 3. Thus, the UPS System 1 is configured in an Off-Line UPS System. Further, the multi-output selector 13 can be configured to provide three or more than three switching unites corresponding to the number of the loads 3. Each switching unit is switchable between a Bypass 10 and the DC to AC inverter 12 for AC power output to the respective load 3. When UPS system 1 is in the normal mode, the input power source 2 can directly provide AC power supply through the Bypass 10 to the respective load(s) 3; if an abnormal status occurs in the UPS system 1 (for example, excessive high or low voltage over a predetermined length of time), the microcontroller 11 will control the multi-output selector 13 to switch from the Bypass 10 to the DC to AC inverter 12, causing the DC to AC inverter 12 to convert the DC power supply of the stored energy systems 14 into AC power supply for output to the respective load(s) 3.

Figure 1:
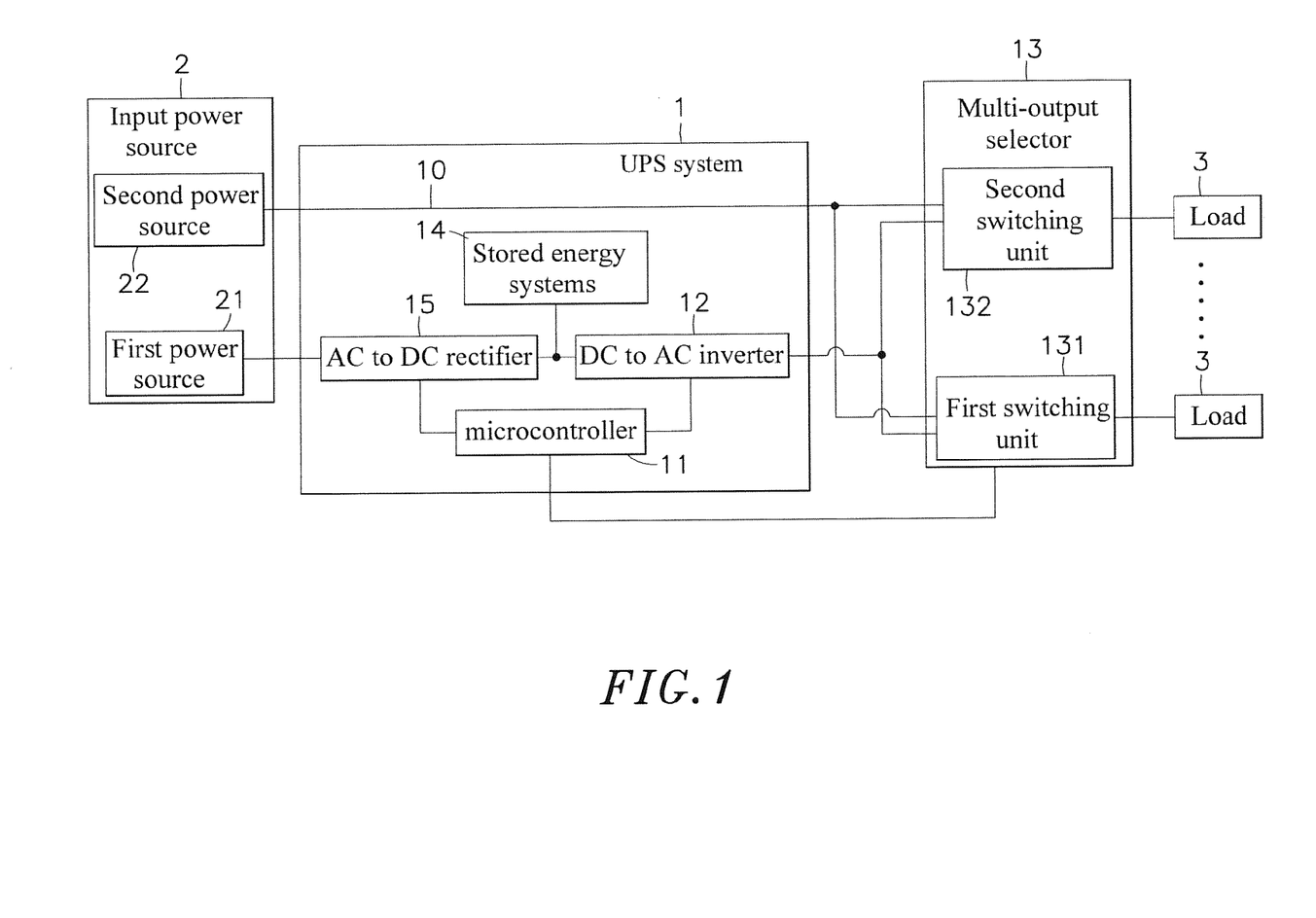
FIG. 1 is a circuit block diagram of a multi-output power management system in accordance with a first embodiment of the present invention.
Figure 2:
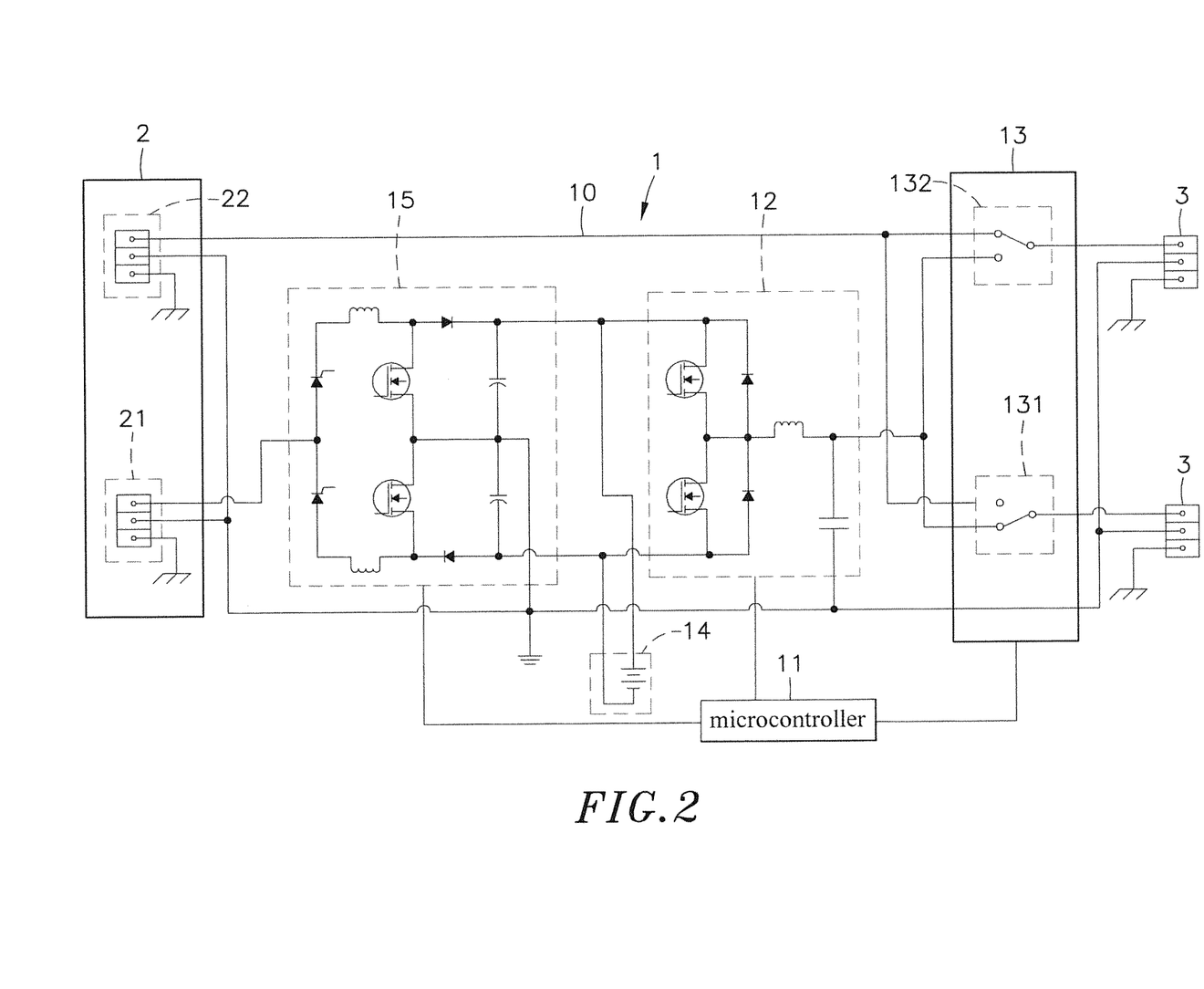
FIG. 2 is a circuit diagram of the UPS System multi-output power management system in accordance with the first embodiment of the present invention.

Further, the UPS System 1 can be configured in an On-Line UPS System. In this case, the UPS system 1 further comprises an AC to DC rectifier 15 electrically coupled with the microcontroller 11, the stored energy systems 14 and the input power source 2; the input power source 2 comprises a first power source 21 and a second power source 22 respectively electrically connected to the multi-output selector 13 and the AC to DC rectifier 15. The power status parameters such as rated voltage, voltage range, total harmonic current distortion, power factor correction, frequency, etc. of the first power source 21 can be equal to or not equal to that of the second power source 22. When the UPS system 1 is in the normal mode, the microcontroller 11 will control the AC to DC rectifier 15 to convert the AC output of the first power source 21 of the input power source 2 into DC power supply for charging the stored energy systems 14 through a battery charger (not shown) or directly by the AC to DC rectifier 15 so that the DC to AC inverter 12 can convert DC power supply into stabilized AC power supply for output through the multi-output selector 13 to the respective load(s) 3, enhancing electrical safety. If an abnormal status occurs, the microcontroller 11 will control the first switching unit 131 and second switching unit 132 of the multi-output selector 13 to switch to the DC to AC inverter 12, causing the DC to AC inverter 12 to convert the DC output of the stored energy systems 14 into AC power supply for output to the respective load 3, and thus, even if the input power source 2 is interrupted, power supply can still be continuously provided to the loads 3. Further, the UPS System 1 can be configured in an On-Line UPS System. In this case, the UPS system 1 further comprises an AC to DC rectifier 15 electrically coupled with the microcontroller 11, the stored energy systems 14 and the input power source 2; the input power source 2 comprises a first power source 21 and a second power source 22 respectively electrically connected to the multi-output selector 13 and the AC to DC rectifier 15. The power status parameters such as rated voltage, voltage range, total harmonic current distortion, power factor correction, frequency, etc. of the first power source 21 can be equal to or not equal to that of the second power source 22. When the UPS system 1 is in the normal mode, the microcontroller 11 will control the AC to DC rectifier 15 to convert the AC output of the first power source 21 of the input power source 2 into DC power supply for charging the stored energy systems 14 through a battery charger (not shown) or directly by the AC to DC rectifier 15 so that the DC to AC inverter 12 can convert DC power supply into stabilized AC power supply for output through the multi-output selector 13 to the respective load(s) 3, enhancing electrical safety. If an abnormal status occurs, the microcontroller 11 will control the first switching unit 131 and second switching unit 132 of the multi-output selector 13 to switch to the DC to AC inverter 12, causing the DC to AC inverter 12 to convert the DC output of the stored energy systems 14 into AC power supply for output to the respective load 3, and thus, even if the input power source 2 is interrupted, power supply can still be continuously provided to the loads 3. Further, when the UPS system 1 is in the Energy Saving Mode, the microcontroller 11 will control the first switching unit 131 and second switching unit 132 of the multi-output selector 13 to switch to the Bypass 10, enabling the AC output of the second power source 22 of the input power source 2 to delivered to the respective load(s) 3, reducing power loss and enhancing the energy efficiency of the UPS system 1 to achieve energy saving effects.

Figure 3:
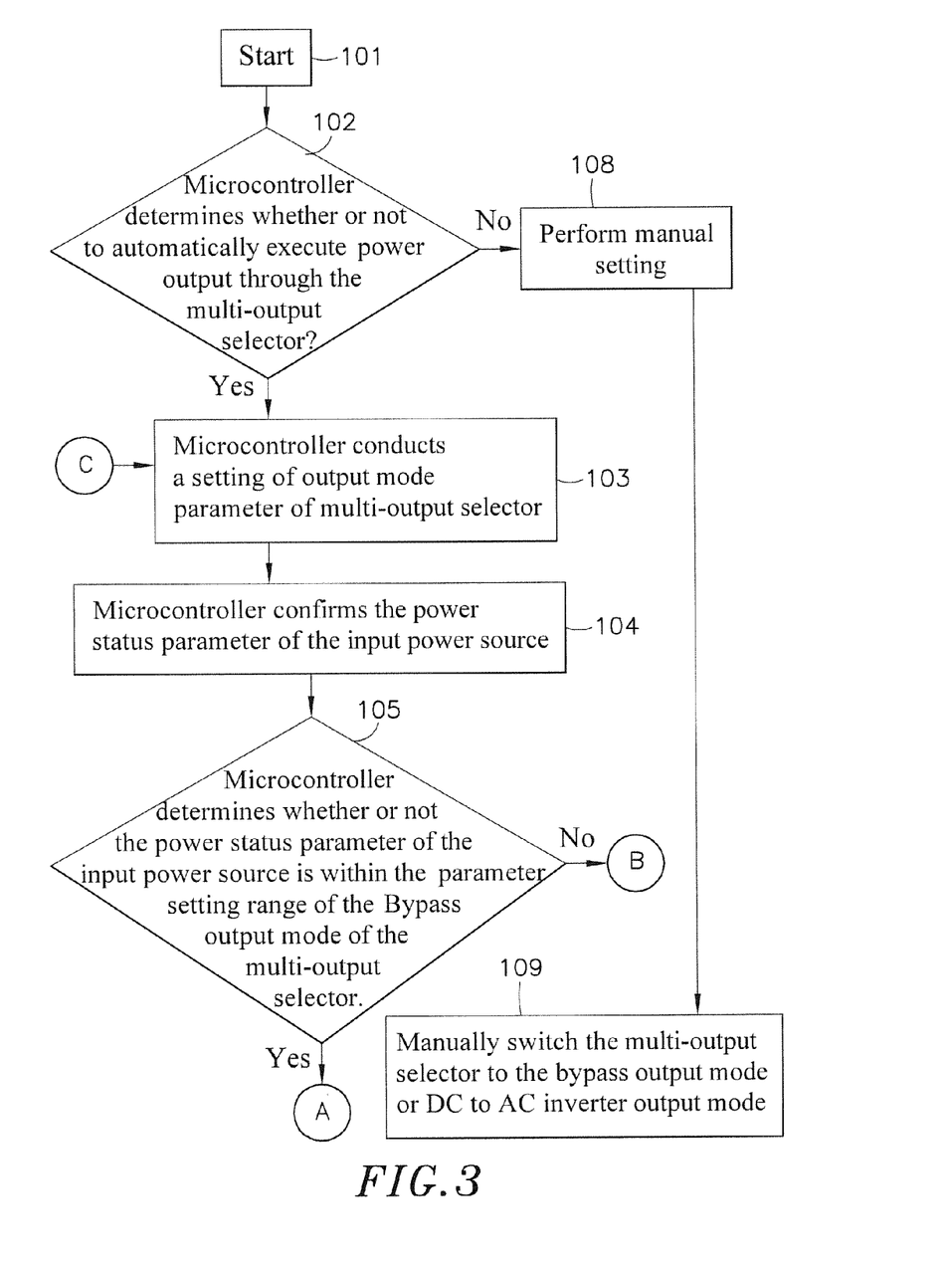
FIG. 3 is a flow chart of a multi-output power management method applied to the multi-output power management system in accordance with the first embodiment of the present invention (I).
Figure 4:
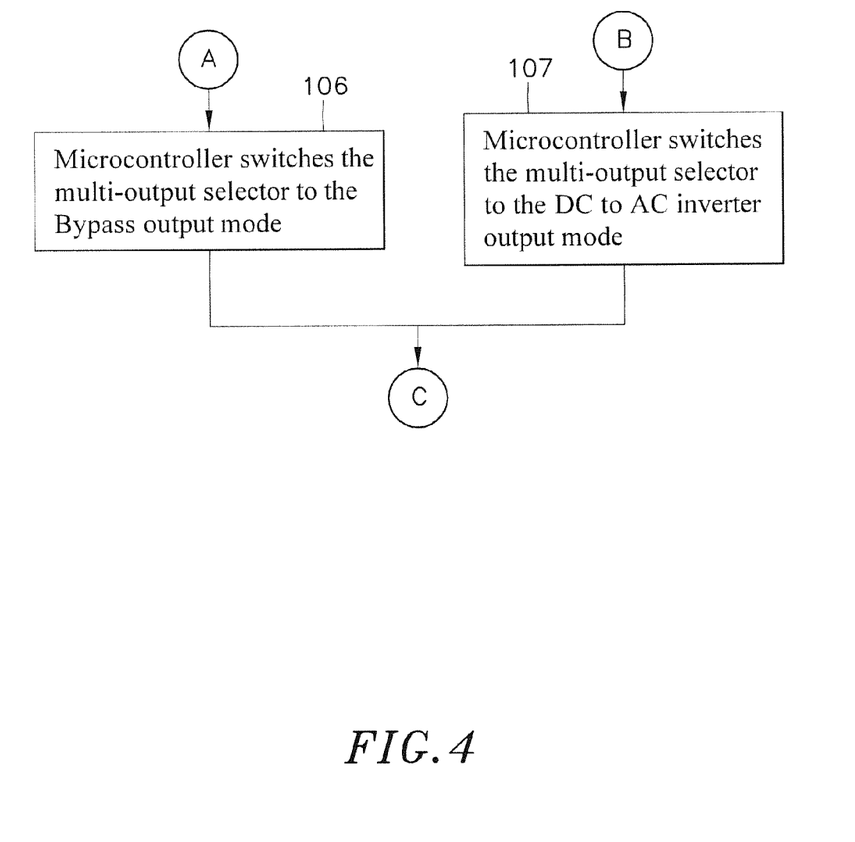
FIG. 4 is a flow chart of the multi-output power management method applied to the multi-output power management system in accordance with the first embodiment of the present invention (II).

The multi-output power management method comprises the steps of:

(101) Start.

(102) The microcontroller 11 determines whether or not to automatically execute power output through the multi-output selector 13. And then, the microcontroller 11 proceeds to step (103) if positive, or step (108) if negative.

(103) The microcontroller 11 conducts the output mode parameter setting of the multi-output selector 13.

(104) The microcontroller 11 confirms the power status parameter of the input power source 2.

(105) The microcontroller 11 determines whether or not the power status parameter of the input power source 2 is within the parameter setting range of the Bypass 10 output mode of the multi-output selector 13 And then, the microcontroller 11 proceeds to step (106) if positive, or step (107) if negative.

(106) The microcontroller 11 controls the multi-output selector 13 to switch to the Bypass 10 output mode, and then returns to step (103).

(107) The microcontroller 11 controls the multi-output selector 13 to switch to the DC to AC inverter 12 output mode, and then returns to (103).

(108) Perform manual setting.

(109) Manually switch the multi-output selector 13 to the Bypass 10 output mode or DC to AC inverter 12 output mode.

It is clear from the above that in the application of the multi-output power management method of the present invention, the microcontroller 11 of the UPS system 1 determines whether or not to automatically execute power output through the multi-output selector 13. In case of automatic execution, the microcontroller 11 can work with the monitoring system (not shown) to collect power environmental data and the data of the power consumption status of the loads 3 and to conduct statistics and analysis, and then automatically set the output mode parameter of the conduct multi-output selector 13. Thereafter, the microcontroller 11 determines whether or not the power status parameter of the input power source 2 is within the parameter setting range of the Bypass 10 output mode of the multi-output selector 13. If the power status parameter of the input power source 2 is within the parameter setting range of the Bypass 10 output mode of the multi-output selector 13, the microcontroller 11 will control the multi-output selector 13 to switch to the Bypass 10 output mode, enabling the AC power supply to be directly outputted to the load(s) 3 for application. On the contrary, if the power status parameter of the input power source 2 is beyond the parameter setting range of the bypass output mode of the multi-output selector 13, the microcontroller 11 will control the multi-output selector 13 to switch to the DC to AC inverter 12 output mode, enabling a stabilized AC power supply to be outputted to the load(s) 3 for application under the priority of electrical safety. If the determination result of the microcontroller 11 of the UPS system 1 is to perform manual setting, the microcontroller 11 will not automatically set the output mode parameter of the multi-output selector 13, and thus, the user can manually switch each switching unit of the multi-output selector 13 to the Bypass 10 output mode or the DC to AC inverter 12 output mode.

Figure 5:
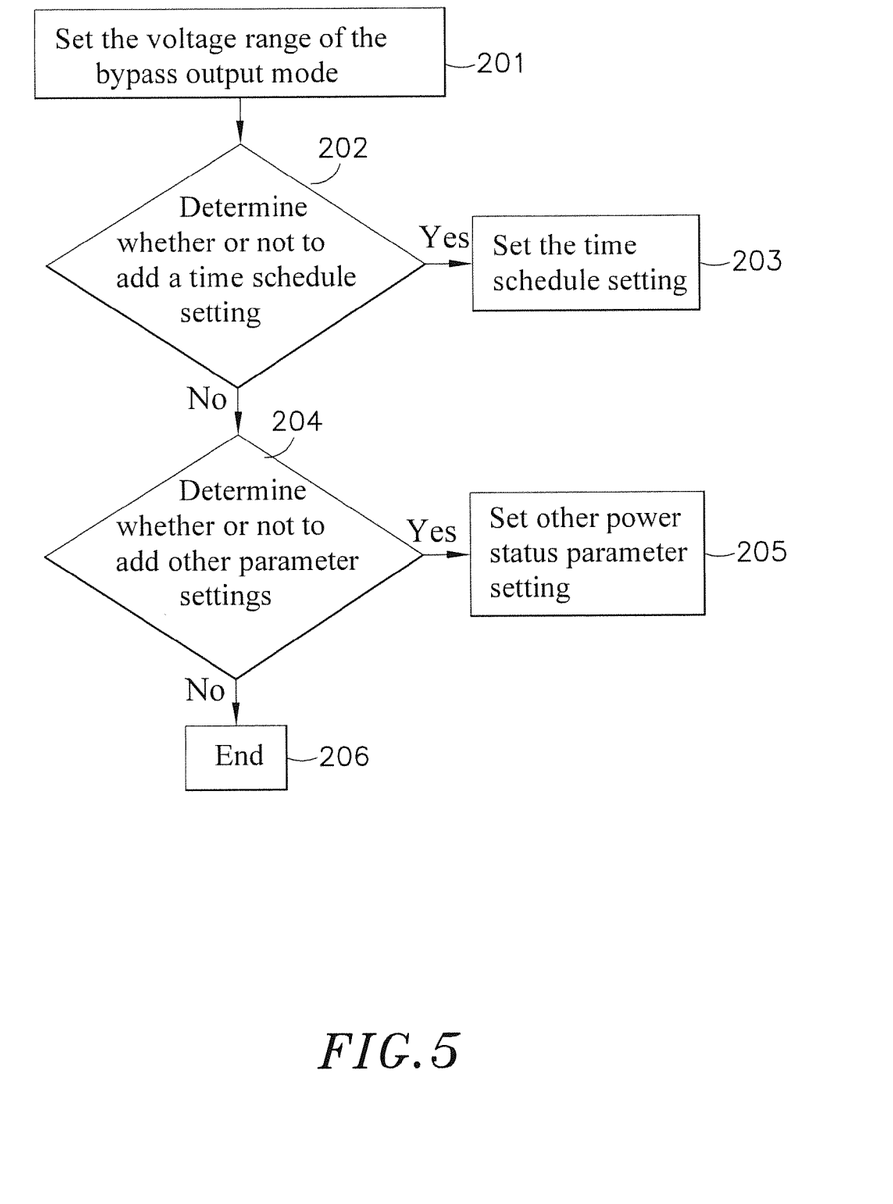
FIG. 5 is a flow chart of the step of the conduction of the microcontroller in the performance of the multi-output selector output mode parameter setting of the multi-output power management method in accordance with the first embodiment of the present invention.

Further, the aforesaid step (103) that the microcontroller 11 conducts the setting of the output mode parameter of the multi-output selector 13 comprises the sub steps of:

(201) Set the voltage range of the Bypass 10 output mode.

(202) Determine whether or not to add a time schedule setting. And then, proceed to sub step (203) if positive, or sub step (204) if negative.

(203) Set the time schedule setting.

(204) Determine whether or not to add other parameter settings. And then proceed to sub step (205) if positive, or sub step (206) if negative.

(205) Conduct other power status parameter settings.

(206) End the procedure.

Figure 6:
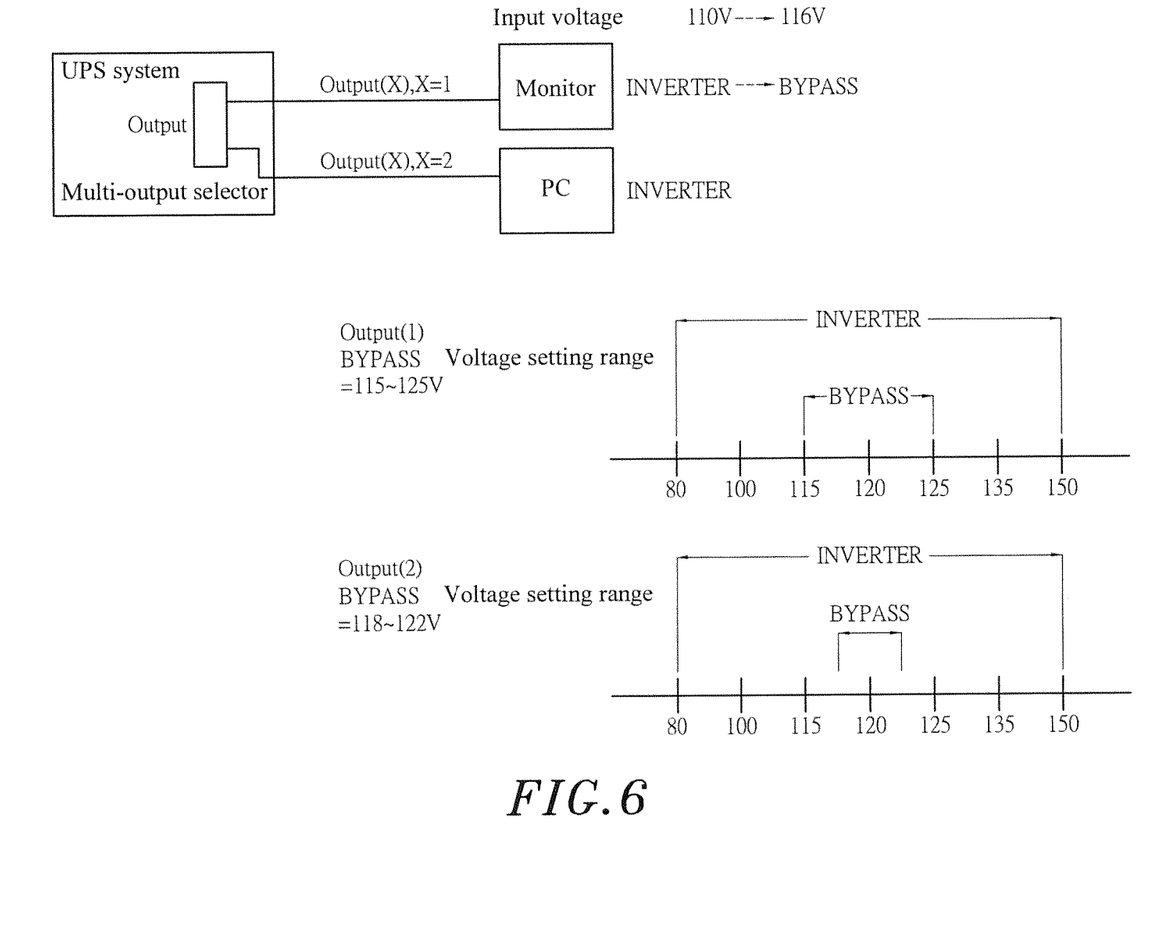
FIG. 6 is a schematic drawing illustrating the UPS system output switching mode of the multi-output power management system in accordance with the first embodiment of the present invention.

It is to be noted that in the embodiment described above, two loads 3, for example, one monitor and one personal computer, are respectively electrically connected to each of the first switching unit 131 and second switching unit 132 of the multi-output selector 13. However, in actual applications multiple loads 3 can be respectively electrically connected to each of the first switching unit 131 and second switching unit 132 of the multi-output selector 13 to meet the requirements in different application or design. Further, the voltage of the input power source 2 is gradually changing from 110V to 116V. When the microcontroller 11 conducts the setting of the voltage range of the multi-output selector 13 at the Bypass 10 output mode, the voltage range of the Bypass 10 output mode for the first switching unit 131 can be within 115V~125V; the voltage range of the Bypass 10 output mode for the second switching unit 132 can be 118V~122V. When the microcontroller 11 confirms that the voltage range of the input power source 2 is gradually changing from 110V to 116V, the initial voltage 110V of the input power source 2 is within the parameter setting range (for example, 80~150V) of the first switching unit 131 and second switching unit 132 of the multi-output selector 13 at the DC to AC inverter 12 output mode, thus, the microcontroller 11 will control the first switching unit 131 and second switching unit 132 of the multi-output selector 13 to maintain the DC to AC inverter 12 output mode, providing AC output directly to the first load 3. If the voltage of the input power source 2 is changed to 116V in the parameter setting range (for example, 115~125V) of the first switching unit 131 of the multi-output selector 13 at the Bypass 10 output mode voltage range, the microcontroller 11 will control the first switching unit 131 of the multi-output selector 13 to switch from the DC to AC inverter 12 output mode to the Bypass 10 output mode, providing AC output directly to the first load 3; similarly, if the voltage of the input power source 2 is gradually changing from 110V to 116V within the parameter setting range of the second switching unit 132 of the multi-output selector 13 at the DC to AC inverter 12 output mode, but not entering the parameter setting range at the Bypass 10 output mode, the second switching unit 132 of the multi-output selector 13 is maintained at the DC to AC inverter 12 output mode to provide AC output to the second load 3. Thus, the microcontroller 11 of the UPS system 1 can conduct the parameter settings of the multi-output selector 13 output mode subject to different load characteristics and operation conditions of multiple loads 3, and can also control the multiple switching unites of the multi-output selector 13 to switch to the Bypass 10 output mode or DC to AC inverter 12 output mode after confirming that the power status parameter of the input power source 2 is within the parameter setting range, providing a different AC output to every respective load 3 under the priority of energy saving or electrical safety, enhancing the power efficiency of the UPS system 1 and achieving the effect of energy saving.

After the microcontroller 11 finished the setting of the voltage range for every switching unit of the multi-output selector 13 at the Bypass 10 output mode, it will then determine if to conduct on the multi-output selector 13 a time schedule setting per every week, at specific dates, or at other time periods. If positive, the microcontroller 11 will conduct a time schedule setting. If negative, the microcontroller 11 will determine if other parameter settings should be added, and will then conduct on the multi-output selector 13 a frequency, power factor correction or other power status parameter setting if positive. After the microcontroller 11 confirmed that the input power source 2 is in conformity with the related power status parameter setting range of the multi-output selector 13, the microcontroller 11 will control the multi-output selector 13 to switch to the Bypass 10 output mode or DC to AC inverter 12 output mode, improving the overall performance and effect of system.

Referring to FIGS. 7-12, a multi-output power management system and a multi-output power management method applied to the multi-output power management system in accordance with a second embodiment of the present invention are shown. In this embodiment, the UPS system is based on the aforesaid On-Line UPS system in combination with Line-Interactive and Off-Line UPS configurations. Based on the On-Line UPS system configuration, the UPS system 1 of this second embodiment further comprises an automatic voltage regulator (AVR) 16 and a transfer switch 17. The automatic voltage regulator 16 is electrically coupled with the first switching unit 131, second switching unit 132 and third switching unit 133 of the multi-output selector 13 and the transfer switch 17. The transfer switch 17 is electrically coupled with the first switching unit 131, second switching unit 132 and third switching unit 133 of the multi-output selector 13 and the second power source 22 of the input power source 2. The multi-output selector 13 is electrically coupled with the third power source 23 of the input power source 2. The first power source 21 can be equal to or not equal to that of the second power source 22, and the second power source 22 can be equal to or not equal to that of the third power source 23. The function of the automatic voltage regulator 16 to automatically regulate the input voltage when the input voltage is excessively high or low is of the known art and the related detailed structural design is not within the scope of the present invention, therefore, no further detailed description in this regard will be necessary.

Figure 7:
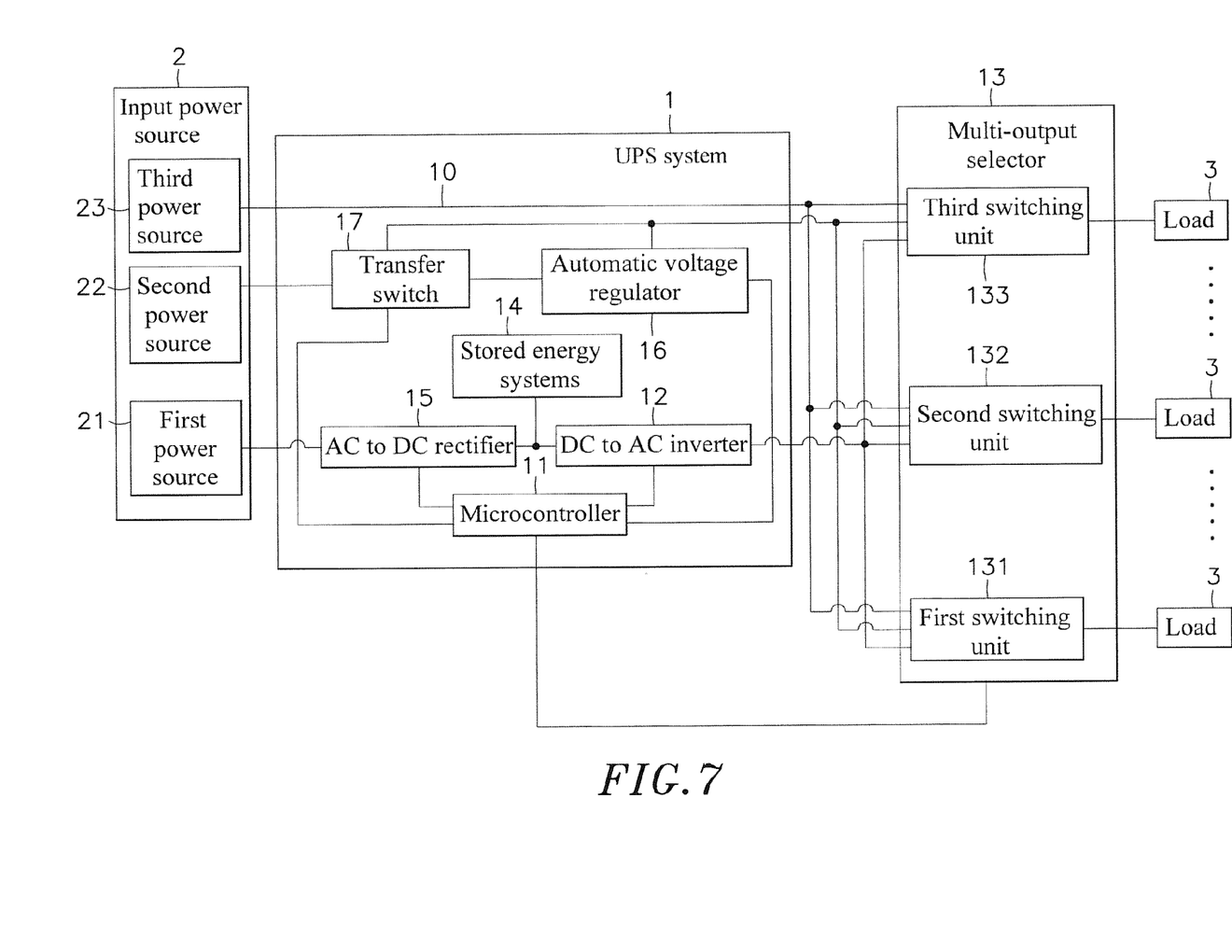
FIG. 7 is a circuit block diagram of a multi-output power management system in accordance with a second embodiment of the present invention.
Figure 8:
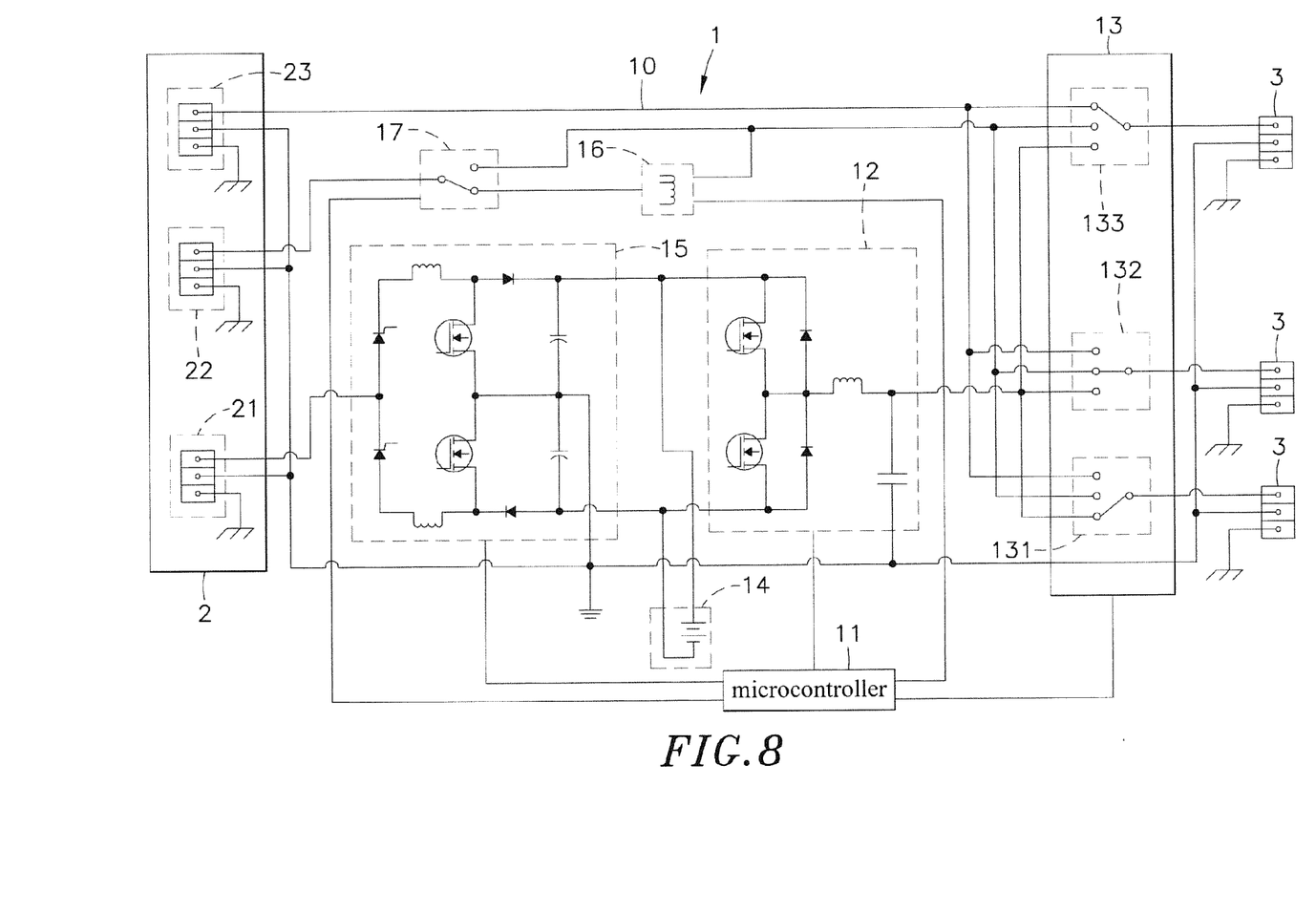
FIG. 8 is a circuit diagram of the UPS System multi-output power management system in accordance with the second embodiment of the present invention.

Further, when the UPS system 1 is in the normal mode, the microcontroller 11 will control the transfer switch 17 to deliver the AC power supply of the second power source 22 of the input power source 2 through the automatic voltage regulator 16 and the first switching unit 131, second switching unit 132 and third switching unit 133 of the multi-output selector 13 to the respective loads 3, enabling the AC to DC rectifier 15 to convert the AC power supply of the first power source 21 of the input power source 2 into a DC power supply for charging the stored energy systems 14. If an abnormal condition occurs, the microcontroller 11 will control the multi-output selector 13 to switch to the DC to AC inverter 12, so that the DC to AC inverter 12 can convert the DC power of the stored energy systems 14 into AC power for output to the respective loads 3, enhancing electrical safety. When the UPS system 1 is in the Energy Saving Mode, the microcontroller 11 will control the multi-output selector 13 to switch to the Bypass 10, enabling the AC power supply of the third power source 23 of the input power source 2 to be directly outputted to the respective loads 3, reducing power loss.

Figure 9:
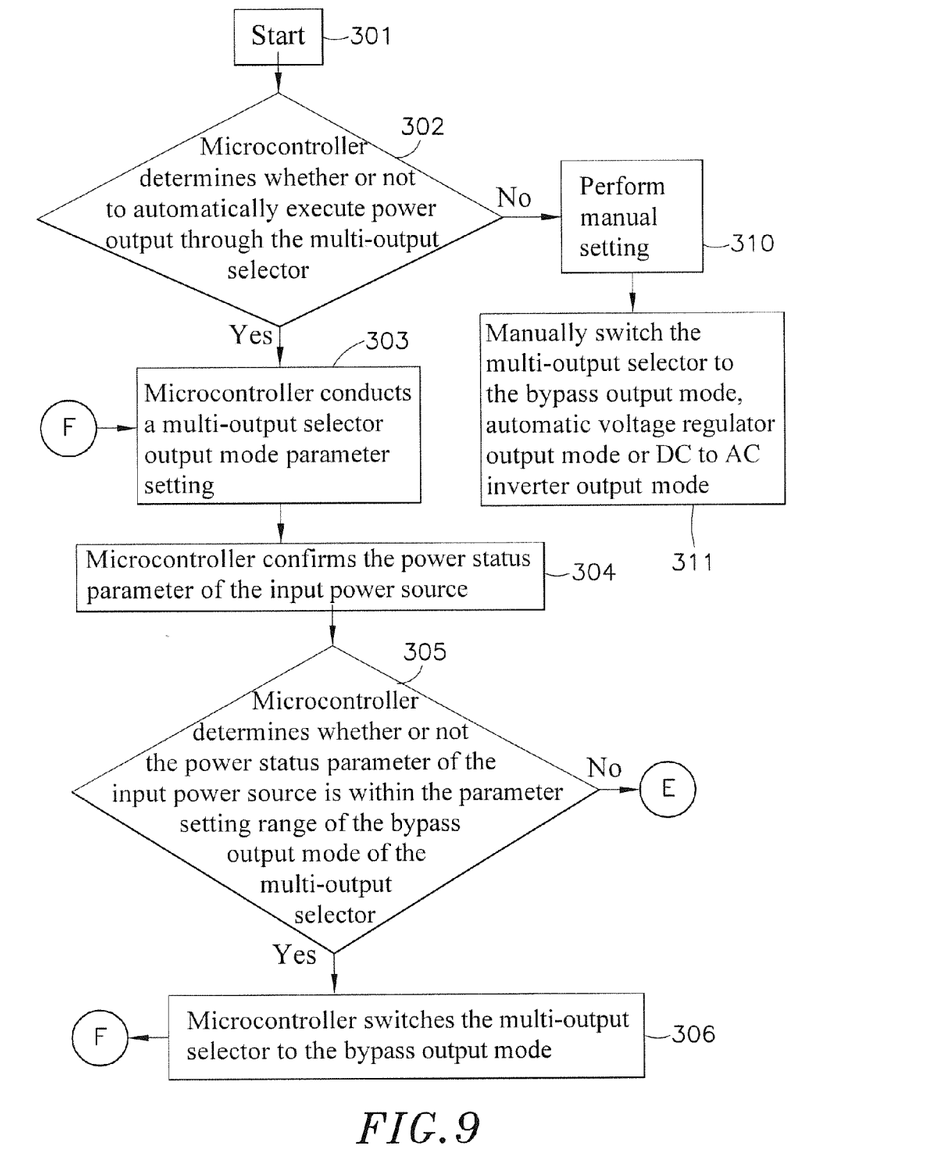
FIG. 9 is a flow chart of the multi-output power management method applied to the multi-output power management system in accordance with the second embodiment of the present invention (I).
Figure 10:
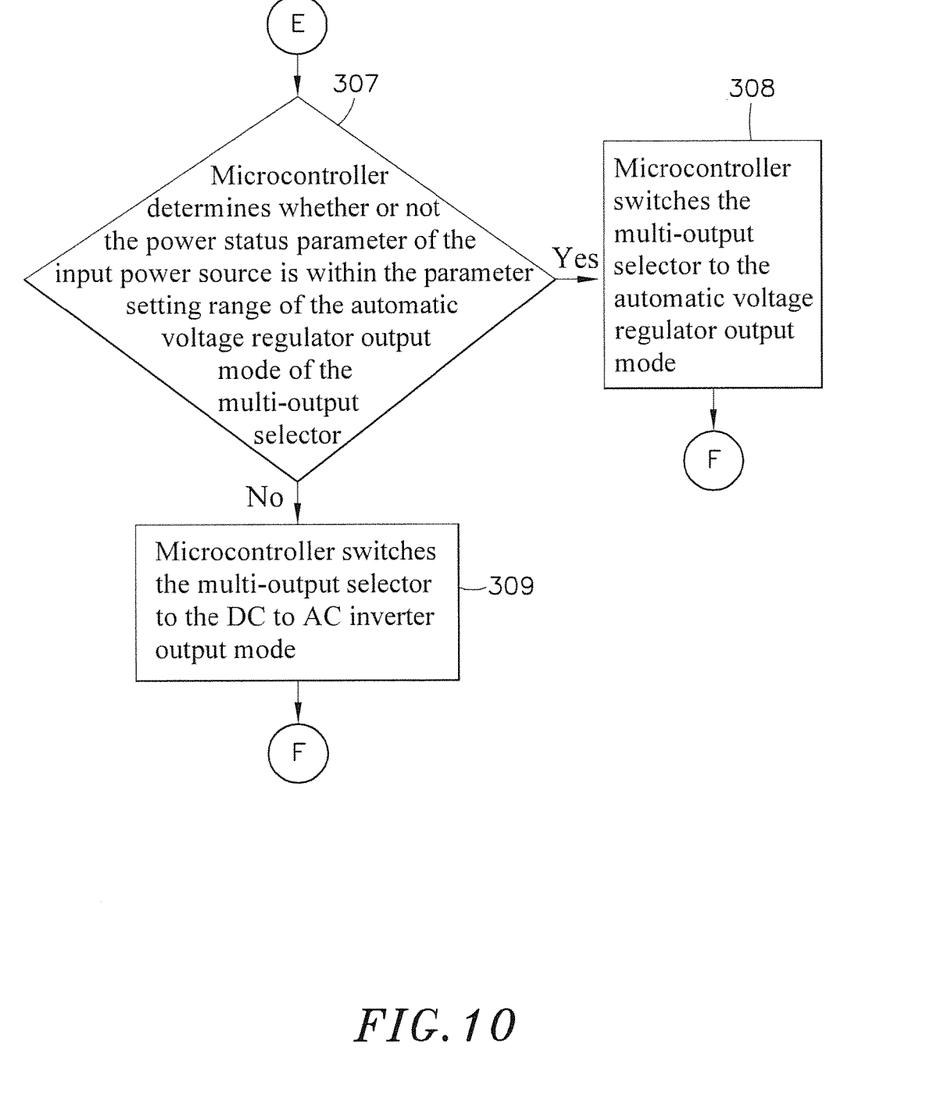
FIG. 10 is a flow chart of the multi-output power management method applied to the multi-output power management system in accordance with the second embodiment of the present invention (II).

The multi-output power management method in accordance with this second embodiment comprises the steps of:

(301) Start.

(302) The microcontroller 11 determines whether or not to automatically execute power output through the multi-output selector 13. And then, proceed to step (303) if positive, or step (310) if negative.

(303) The microcontroller 11 conducts the multi-output selector 13 output mode parameter setting.

(304) The microcontroller 11 confirms the power status parameter of the input power source 2.

(305) The microcontroller 11 determines whether or not the power status parameter of the input power source 2 is within the parameter setting range of the bypass output mode of the multi-output selector 13. And then, proceed to step (306) if positive, or step (307) if negative.

(306) The microcontroller 11 controls the multi-output selector 13 to switch to the Bypass 10 output mode, and then returns to step (303).

(307) The microcontroller 11 determines whether or not the power status parameter of the input power source 2 is within the parameter setting rang of the automatic voltage regulator 16 output mode. And then, the microcontroller 11 proceeds to step (308) if positive, or step (309) if negative.

(308) The microcontroller 11 controls the multi-output selector 13 to switch to the automatic voltage regulator 16 output mode, and then returns to (303).

(309) The microcontroller 11 controls the multi-output selector 13 to switch to the DC to AC inverter 12 output mode, and then returns to step (303).

(310) Perform manual setting.

(311) Manually switch the multi-output selector 13 to the Bypass 10 output mode, the automatic voltage regulator 16 output mode, or the DC to AC inverter 12 output mode.

It is clear from the above that in the application of the multi-output power management method in accordance with this second embodiment of the present invention, steps (301)~(311) are substantially similar to steps (101)~(109) with the exception of steps (307)~(308) where when the microcontroller 11 determined the power status parameter of the input power source 2 is within the parameter setting range of the automatic voltage regulator 16, the microcontroller 11 will then control the multi-output selector 13 to switch to the automatic voltage regulator 16 output mode, enabling the automatic voltage regulator 16 to maintain a stabilized voltage output without being affected by the variation of the input power source 2 and the loads 3. Further, unlike step (109) of manually switching the multi-output selector 13 to the Bypass 10 output mode or the DC to AC inverter 12 output mode, step (311) is to manually switch the multi-output selector 13 to the Bypass 10 output mode, the automatic voltage regulator 16 output mode or the DC to AC inverter 12 output mode.

Figure 12:
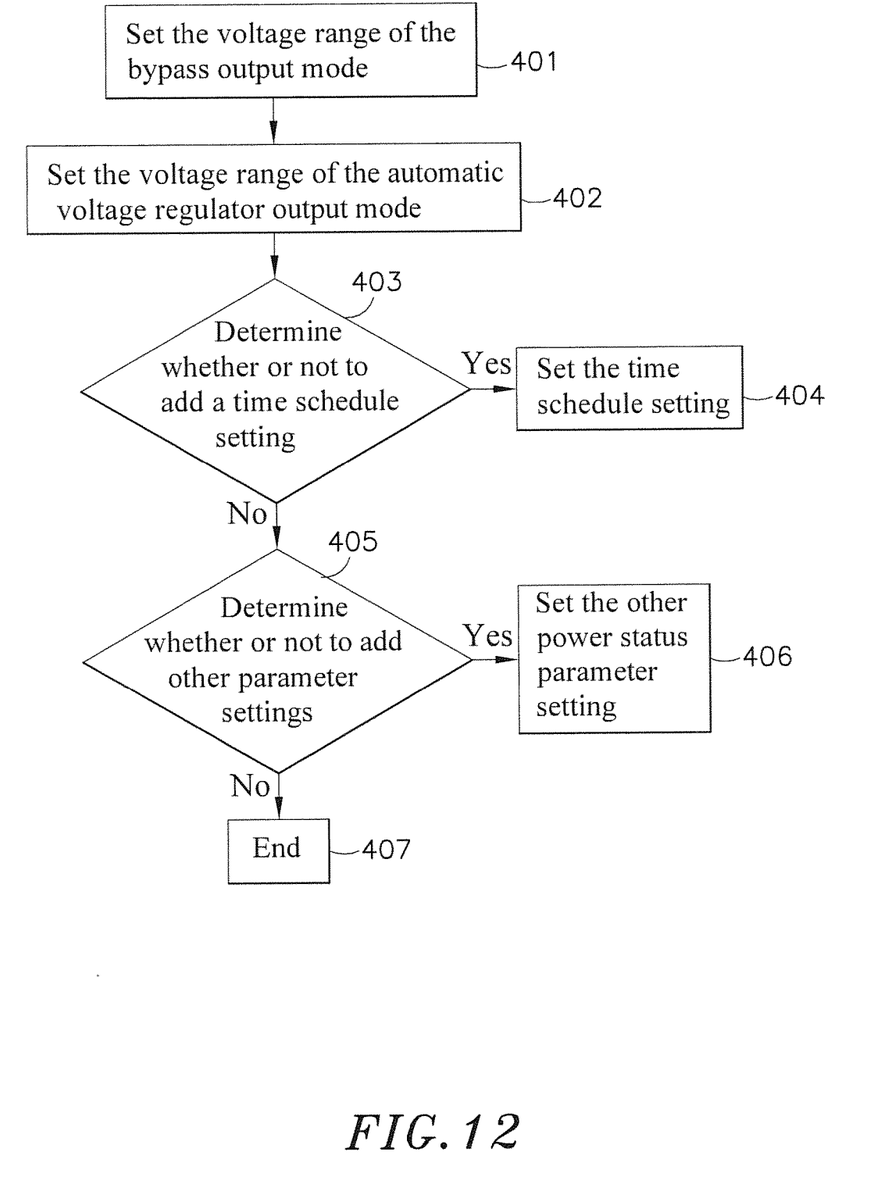
FIG. 12 is a flow chart of the step of the conduction of the microcontroller in the performance of the multi-output selector output mode parameter setting of the multi-output power management method in accordance with the second embodiment of the present invention.

Further, the aforesaid step (303) that the microcontroller 11 conducts the multi-output selector 13 output mode parameter setting comprises the sub steps of:

(401) Set the voltage range of the Bypass 10 output mode.

(402) Set the voltage range of the automatic voltage regulator 16 output mode.

(403) Determine whether or not to add a time schedule setting. And then, proceed to sub step (404) if positive, or sub step (405) if negative.

(404) Set the time schedule setting.

(405) Determine whether or not to add other parameter settings. And then proceed to sub step (406) if positive, or sub step (407) if negative.

(406) Set other power status parameter settings.

(407) End the procedure.

It is clear from the above that steps (401)~(407) are substantially similar to steps (201)~(206) with the exception that the microcontroller 11 conducts the setting of the voltage range of the automatic voltage regulator 16 output mode immediately after the setting of the voltage range of the Bypass 10 output mode before proceeding to the sub step of determining whether to conduct on the multi-output selector 13 a time schedule setting per every week, at specific dates, or at other time periods.

In this second embodiment, the multi-output selector 13 of the UPS system 1 is configured to provide three switching units, namely, the first switching unit 131, the second switching unit 132 and the third switching unit 133 for the connection of respective loads 3 that can be, for example, a monitor, a personal computer and a server. However, in actual application, the multi-output selector 13 can be configured to provide more than three switching units for the connection of more than three loads. When the microcontroller 11 conducts the setting of the voltage range of the multi-output selector 13 at the Bypass 10 output mode, the voltage range of the first switching unit 131 can be set in the range of 110V~125V for the Bypass 10 output mode and in the range of 100V~135V for the automatic voltage regulator 16 output mode, and the voltage range of the second switching unit 132 can be set in the range of 118V~122V for the Bypass 10 output mode and in the range of 105V~130V for the automatic voltage regulator 16 output mode. Further, with respective to the setting of the third switching unit 133 of the multi-output selector 13, because the user does not use the voltage of the Bypass 10, it is not necessary to set the voltage range of the third switching unit 133 of the multi-output selector 13 for the Bypass 10 output mode.

Figure 11:
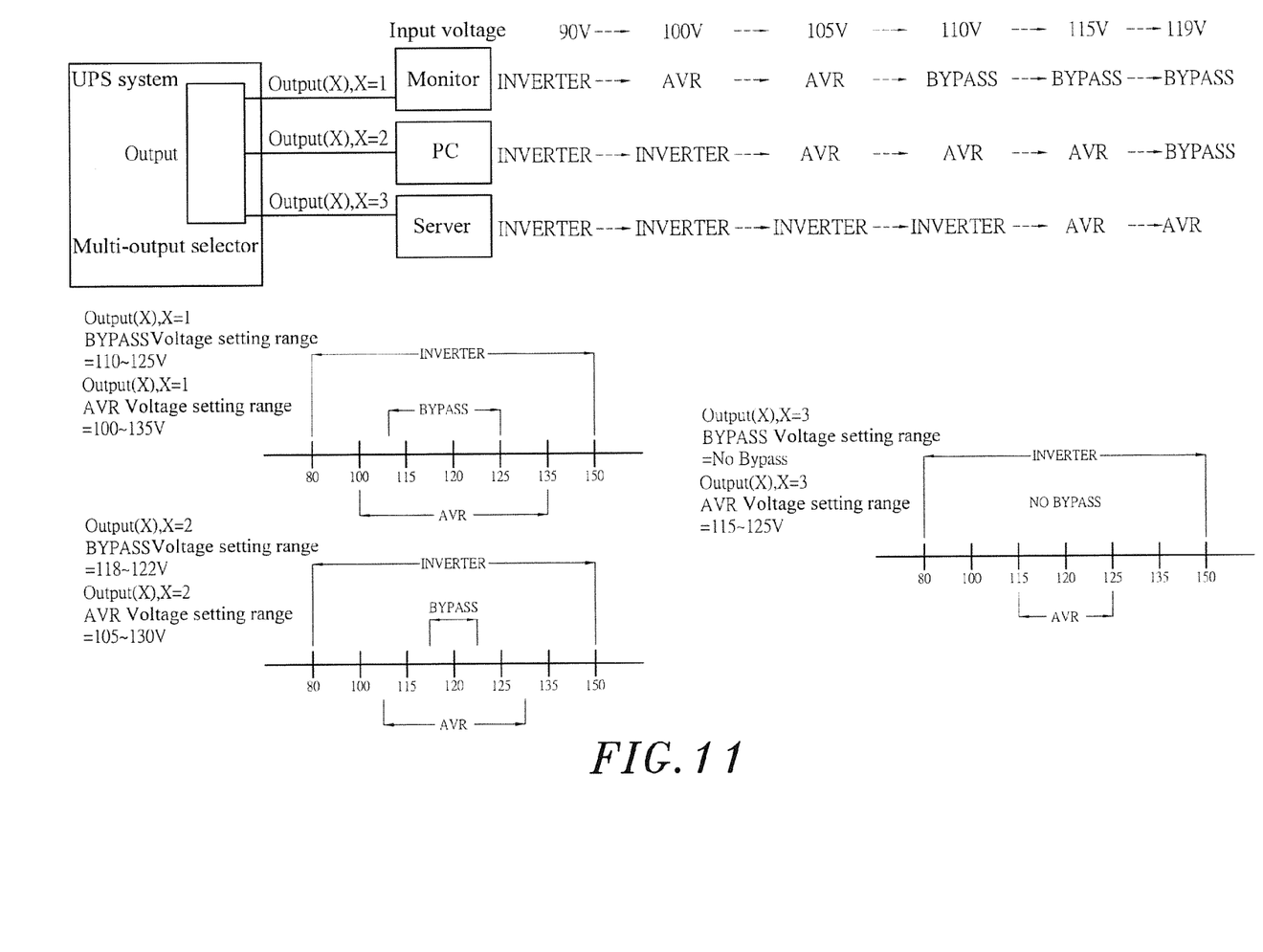
FIG. 11 is a schematic drawing illustrating the UPS system output switching mode of the multi-output power management system in accordance with the second embodiment of the present invention.

If the microcontroller 11 confirms the voltage of the input power source 2 is 90V that is within the parameter setting range of the first switching unit 131, second switching unit 132 and third switching unit 133 of the multi-output selector 13 at the DC to AC inverter 12 output mode (for example, 80V~150V), the microcontroller 11 will control the first switching unit 131, second switching unit 132 and third switching unit 133 of the multi-output selector 13 to maintain the DC to AC inverter 12 output mode for providing AC power supply to every respective load 3 (for example, the first load, the second load and the third load). Similarly, if the microcontroller 11 confirms the voltage of the input power source 2 is gradually changed from 90V to 100V that is within the parameter setting range of the first switching unit 131 of the multi-output selector 13, the microcontroller 11 will switch the first switching unit 131 of the multi-output selector 13 to the automatic voltage regulator 16 output mode for providing stabilized AC output to the first load 3, and at the same time, the microcontroller 11 will maintain the second switching unit 132 and third switching unit 133 of the multi-output selector 13 in the DC to AC inverter 12 output mode for providing AC power supply to the second and third loads 3. If the microcontroller 11 confirms that the voltage of the input power source 2 has changed to 105V, the microcontroller 11 will switch the first switching unit 131 and second switching unit 132 of the multi-output selector 13 to the automatic voltage regulator 16 output mode to provide stabilized AC output to the first and second loads 3 while maintaining the third switching unit 133 of the multi-output selector 13 at the DC to AC inverter 12 output mode for providing AC power supply to the load 3.

However, if the microcontroller 11 confirms that the voltage of the input power source 2 has changed to 110V, the microcontroller 11 will switch the first switching unit 131 of the multi-output selector 13 to the Bypass 10 output mode to let the inputted AC power supply be directly delivered to the first load 3 while maintaining the second switching unit 132 at the automatic voltage regulator 16 output mode for providing stabilized AC power supply to the second load 3 and maintaining the third switching unit 133 of the multi-output selector 13 at the DC to AC inverter 12 output mode for providing AC power supply to the third load 3. If the microcontroller 11 confirms that the voltage of the input power source 2 has changed to 115V, the microcontroller 11 will maintain the first switching unit 131 of the multi-output selector 13 at the Bypass 10 output mode to directly provide inputted AC power supply to the first load 3 and maintain the second switching unit 132 at the automatic voltage regulator 16 output mode for providing stabilized AC power supply to the second load 3, and will also simultaneously switch the third switching unit 133 to the automatic voltage regulator 16 output mode for providing stabilized AC power supply to the third load 3.

Thus, if the microcontroller 11 of the UPS system 1 confirms that the voltage of the input power source 2 has changed to 119V, the microcontroller 11 will maintain the first switching unit 131 of the multi-output selector 13 at the Bypass 10 output mode to let the inputted AC power supply be directly delivered to the first load 3, and will also switch the second switching unit 132 to the Bypass 10 output mode for enabling the inputted AC power supply to be directly delivered to the second load 3 while maintaining the third switching unit 133 at the automatic voltage regulator 16 output mode for providing stabilized AC power supply to the third load 3. Therefore, the microcontroller 11 of the UPS system 1 can conduct different output mode parameter settings on the multiple switching units (such as, first switching unit 131, second switching unit 132 and third switching unit 133) of the multi-output selector 13 subject to different characteristics and operation conditions of different loads (such as, first, second and third loads 3). After confirming that the power status parameter of the input power source 2 is within the parameter setting range, the microcontroller 11 can then switch the loads 3 to the Bypass 10 output mode, automatic voltage regulator 16 output mode or DC to AC inverter 12 output mode subject to automatic setting or manual setting, providing a different AC output to every respective load that requires energy saving or electrical safety in the priority, and thus, the power efficiency of the UPS system 1 is significantly improved, achieving the effect of energy saving.

Although particular embodiment of the invention have been described in detail for purposes of illustration, various modifications and enhancements may be made without departing from the spirit and scope of the invention. Accordingly, the invention is not to be limited except as by the appended claims.

What the invention claimed is:

1. A multi-output power management method used in a multi-output power management system comprising an input power source, a UPS (Uninterruptible Power Supply) system and a plurality of loads, said UPS system comprising a microcontroller, a DC to AC inverter and a multi-output selector electrically coupled to said microcontroller, stored energy system electrically coupled to said DC to AC inverter, and said DC to AC inverter electrically coupled to said multi-output selector, said input power source and said loads, said microcontroller being adapted to switch said multi-output selector to a bypass output mode or direct output of AC power supply of said input power source to said load when said UPS system is in an energy saving mode, and to switch said multi-output selector to a DC to AC inverter output mode for enabling said DC to AC inverter to convert a DC output of said stored energy systems into AC power supply and providing the converted AC power supply to each respective said load when an abnormal condition occurs in said UPS system, said multi-output power management method comprising steps of:

(a1) said microcontroller determining whether to automatically execute power output through said multi-output selector;

(a2) said microcontroller conducting a multi-output selector output mode parameter setting when said determined result of said step (a1) is positive;

(a3) said microcontroller confirming the power status parameter of said input power source;

(a4) said microcontroller determining if the power status parameter of said input power source is within the parameter setting range of the bypass output mode of said multi-output selector;

(a5) said microcontroller switching said multi-output selector to the bypass output mode, and then returning to step (a2) when said determined result of said step (a4) is positive;

(a6) said microcontroller switching said multi-output selector to the DC to AC inverter output mode, and then returning to step (a2) when said determined result of said step (a4) is negative;

(a7) performing manual setting when said determined result of said step (a1) is negative; and (a8) manually switching said multi-output selector to the bypass output mode or DC to AC inverter output mode.

2. The multi-output power management method as claimed in claim 1, wherein said UPS system further comprises an AC to DC rectifier electrically coupled to said microcontroller, said stored energy systems and said input power source.

3. The multi-output power management method as claimed in claim 1, wherein said multi-output selector of said UPS system comprises a plurality of switching units respectively coupled with one respective said load, each said switching unit being selectively comprised of a relay or static transfer switch.

4. The multi-output power management method as claimed in claim 1, wherein said step (a2) where said microcontroller conducts a multi-output selector output mode parameter setting comprises sub steps of:

(b1) setting the voltage range of the bypass output mode;
(b2) determining whether to add a time schedule setting;
(b3) setting the time schedule setting when said determined result of said sub step (b2) is positive;
(b4) determining whether to add other parameter settings when said determined result of said sub step (b2) is negative;
(b5) setting other power status parameter settings when said determined result of said sub step (b4) is positive; and
(b6) ending the procedure when said determined result of said sub step (b4) is negative.

5. The multi-output power management method as claimed in claim 1, wherein said power status parameter in said step (a3) is the rated voltage, voltage range, total harmonic current distortion, power factor correction or frequency.

6. A multi-output power management method used in a multi-output power management system comprising an input power source, a UPS (Uninterruptible Power Supply) system and a plurality of loads, said UPS system comprising a microcontroller, a DC to AC inverter and a multi-output selector electrically coupled to said microcontroller, stored energy systems electrically coupled to said DC to AC inverter, said DC to AC inverter electrically coupled to said multi-output selector, said input power source and said loads, an AC to DC rectifier electrically coupled to said microcontroller, said stored energy systems and said input power source, and an automatic voltage regulator and a transfer switch electrically coupled to said microcontroller, said automatic voltage regulator being also electrically coupled to said multi-output selector and said transfer switch, said transfer switch being also electrically coupled to said multi-output selector and said input power source, said multi-output selector being also electrically coupled to said input power source, said microcontroller being adapted to switch said multi-output selector to a bypass output mode for direct output of AC power supply of said input power source to said load when said UPS system is in an energy saving mode, and to switch said multi-output selector to a DC to AC inverter output mode for enabling said DC to AC inverter to convert a DC output of said stored energy systems into AC power and providing the converted AC power to each respective said load when an abnormal condition occurs in said UPS system, said multi-output power management method comprising steps of:

(c1) said microcontroller determining whether to automatically execute power output through said multi-output selector;
(c2) said microcontroller conducting a multi-output selector output mode parameter setting when said determined result of said step (c1) is positive;
(c3) said microcontroller confirming the power status parameter of said input power source;
(c4) said microcontroller determining if the power status parameter of said input power source is within the parameter setting range of the bypass output mode of said multi-output selector;
(c5) said microcontroller switching said multi-output selector to the bypass output mode when said determined result of said step (c4) is positive, and then returning to said step (c2);
(c6) said microcontroller determining if the power status parameter of said input power source is within the parameter setting range of the output mode of said automatic voltage regulator when said determined result of said step (c4) is negative;
(c7) said microcontroller switching said multi-output selector to the automatic voltage regulator output mode when said determined result of said step (c6) is positive, and then returning to said step (c2);
(c8) said microcontroller switching said multi-output selector to the DC to AC inverter output mode when said determined result of said step (c06) is negative, and then returning to step (c2);
(c9) performing manual setting when said determined result of said step (c1) is negative;
(c10) manually switching said multi-output selector to the bypass output mode or DC to AC inverter output mode.

7. The multi-output power management method as claimed in claim 6, wherein said multi-output selector of said UPS system comprises a plurality of switching units respectively coupled with one respective said load, each said switching unit being selectively comprised of a relay or static transfer switch.

8. The multi-output power management method as claimed in claim 6, wherein said step (c2) with said microcontroller conducting said multi-output selector output mode parameter setting comprises sub steps of:

(d1) setting the voltage range of the bypass output mode;
(d2) setting the voltage range of the automatic voltage regulator output mode;
(d3) determining if to add a time schedule setting;
(d4) setting the time schedule settings when said determined result of said sub step (d3) is positive;
(d5) determining whether to add other parameter settings when said determined result of said sub step (d3) is negative;
(d6) setting other power status parameter settings when said determined result of said sub step (d5) is positive;
(d7) ending the procedure when said determined result of said sub step (d5) is negative.

9. The multi-output power management method as claimed in claim 6, wherein said power status parameter in said step (c3) is the rated voltage, voltage range, total harmonic current distortion, power factor correction or frequency.

* * * * *